United States Patent [19]
Law et al.

[11] Patent Number: 5,269,554
[45] Date of Patent: Dec. 14, 1993

[54] TRAILER HITCH ALIGNMENT GUIDE

[76] Inventors: Benjamin J. Law, 281 S. 17th Pl. Box 185, Show Low, Ariz. 85901; Harry W. Law, 1455 S. Stale St. #21, Hemet, Calif. 92543

[21] Appl. No.: 874,520

[22] Filed: Apr. 27, 1992

[51] Int. Cl.$^5$ .............................................. B60D 1/40
[52] U.S. Cl. ...................................... 280/477; 33/264
[58] Field of Search .................. 280/477; 33/264, 286, 33/288

[56] References Cited

U.S. PATENT DOCUMENTS

| | | | |
|---|---|---|---|
| 3,015,162 | 1/1962 | Bohnet | 280/477 |
| 4,012,056 | 3/1977 | Christensen | 280/477 |
| 4,313,264 | 2/1982 | Miller, Sr. | 280/477 |
| 4,666,176 | 5/1987 | Sand | 280/477 |
| 4,723,788 | 2/1988 | Suter | 33/264 |
| 5,035,441 | 7/1991 | Murray | 280/477 |

FOREIGN PATENT DOCUMENTS

| | | | |
|---|---|---|---|
| 934358 | 8/1963 | United Kingdom | 280/477 |
| 9014968 | 12/1990 | World Int. Prop. O. | 280/477 |

Primary Examiner—Margaret A. Focarino
Assistant Examiner—Kevin Hurley
Attorney, Agent, or Firm—Leon Gilden

[57] ABSTRACT

An alignment guide includes a plurality of guide assemblies, one of which is mounted to a trailer hitch ball and the other mounted to a trailer tongue, wherein the guides each include telescoping vertical leg members for alignment and communication relative to one another for the positioning of a trailer hitch tongue relative to an associated trailer ball.

3 Claims, 5 Drawing Sheets

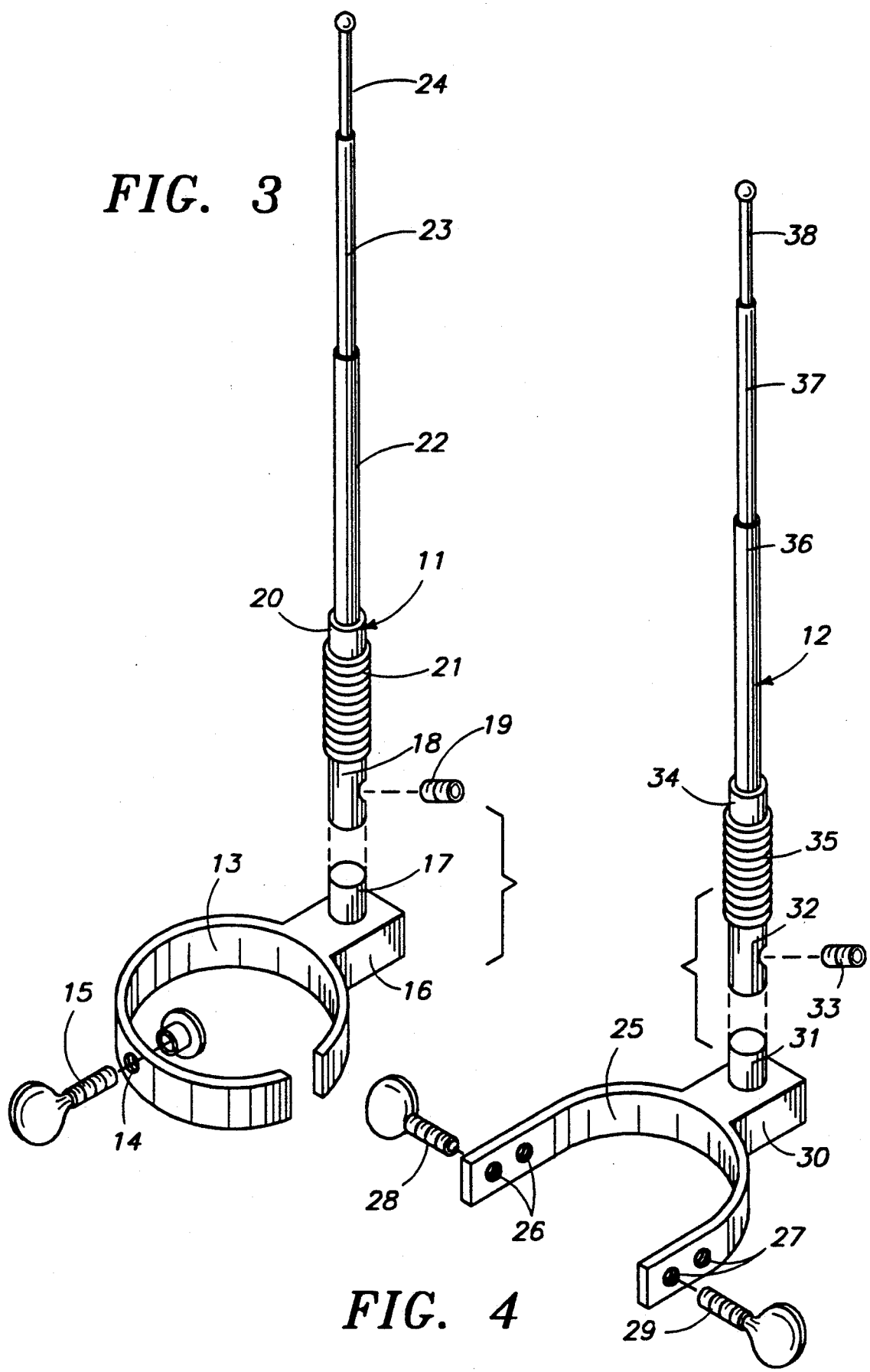

TRAILER HITCH ALIGNMENT GUIDE

BACKGROUND OF THE INVENTION

1. Field of the Invention

The field of invention relates to trailer hitch apparatus, and more particularly pertains to a new and improved trailer hitch alignment guide apparatus wherein the same is directed to the alignment of a trailer hitch ball relative to a trailer hitch guide utilizing the organization readily secured and mounted to the associated ball and trailer tongue structure.

2. Description of the Prior Art

The alignment of a trailer hitch ball relative to a trailer tongue is frequently a problem due to limited visibility of a driver of an associated tow vehicle as the driver attempts to back up in alignment of the trailer hitch ball relative to an associated trailer tongue or coupling member. Typically, the trailer tongue has an inverted socket for receiving a trailer ball or sphere and the proper coaxial alignment of the socket and sphere are a particular problem due to limited visibility as such trailer structure is typically below a line of sight. A visual aid in accommodating the alignment of the trailer components is set forth in the U.S. Pat. No. 4,666,176 to Sand wherein a first vertical leg mounted to a trailer tongue cooperates with a second vertical leg having a U-shaped recess to receive the trailer tongue therewithin.

U.S. Pat. No. 4,871,185 to Charkoff, et al. sets forth an alignment guide for trailer structure, wherein the alignment guide is of a U-shaped abutment to direct a trailer hitch tongue into an associated trailer hitch ball engagement.

U.S. Pat. No. 4,511,159 to Younger sets forth a further example of a trailer guide assembly utilizing an elongate guide bar arranged to extend rearwardly of a tow vehicle, with a mover system attached to the guide bar used to move a jack shaft along the guide bar.

U.S. Pat. No. 4,781,394 to Schwarz, et al. sets forth a further example of an arcuate abutment guide to direct a trailer coupling or tongue into association with a trailer ball.

As such, it may be appreciated that there continues to be a need for a new and improved trailer hitch alignment guide apparatus as set forth by the instant invention which addresses both the problems of ease of use as well as effectiveness in construction in mounting the organization relative to various trailer components and in this respect, the present invention substantially fulfills this need.

SUMMARY OF THE INVENTION

In view of the foregoing disadvantages inherent in the known types of trailer hitch apparatus now present in the prior art, the present invention provides a trailer hitch alignment guide apparatus wherein the same is directed to coaxially align a trailer hitch socket relative to a trailer tow ball. As such, the general purpose of the present invention, which will be described subsequently in greater detail, is to provide a new and improved trailer hitch alignment guide apparatus which has all the advantages of the prior art trailer hitch apparatus and none of the disadvantages.

To attain this, the present invention provides an alignment guide including a plurality of guide assemblies, one of which is mounted to a trailer hitch ball and the other mounted to a trailer tongue, wherein the guides each include telescoping vertical leg members for alignment and communication relative to one another for the positioning of a trailer hitch tongue relative to an associated trailer ball.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved trailer hitch alignment guide apparatus which has all the advantages of the prior art trailer hitch apparatus and none of the disadvantages.

It is another object of the present invention to provide a new and improved trailer hitch alignment guide apparatus which may be easily and efficiently manufactured and marketed.

It is a further object of the present invention to provide a new and improved trailer hitch alignment guide apparatus which is of a durable and reliable construction.

An even further object of the present invention is to provide a new and improved trailer hitch alignment guide apparatus which is susceptible of a low cost of manufacture with regard to both materials and labor, and which accordingly is then susceptible of low prices of sale to the consuming public, thereby making such trailer hitch alignment guide apparatus economically available to the buying public.

Still yet another object of the present invention is to provide a new and improved trailer hitch alignment guide apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the first guide assembly of the invention.

FIG. 4 is an isometric illustration of the second guide assembly of the invention.

DESCRIPTION OF THE PREFERRED EMBODIMENT

Figure 1:
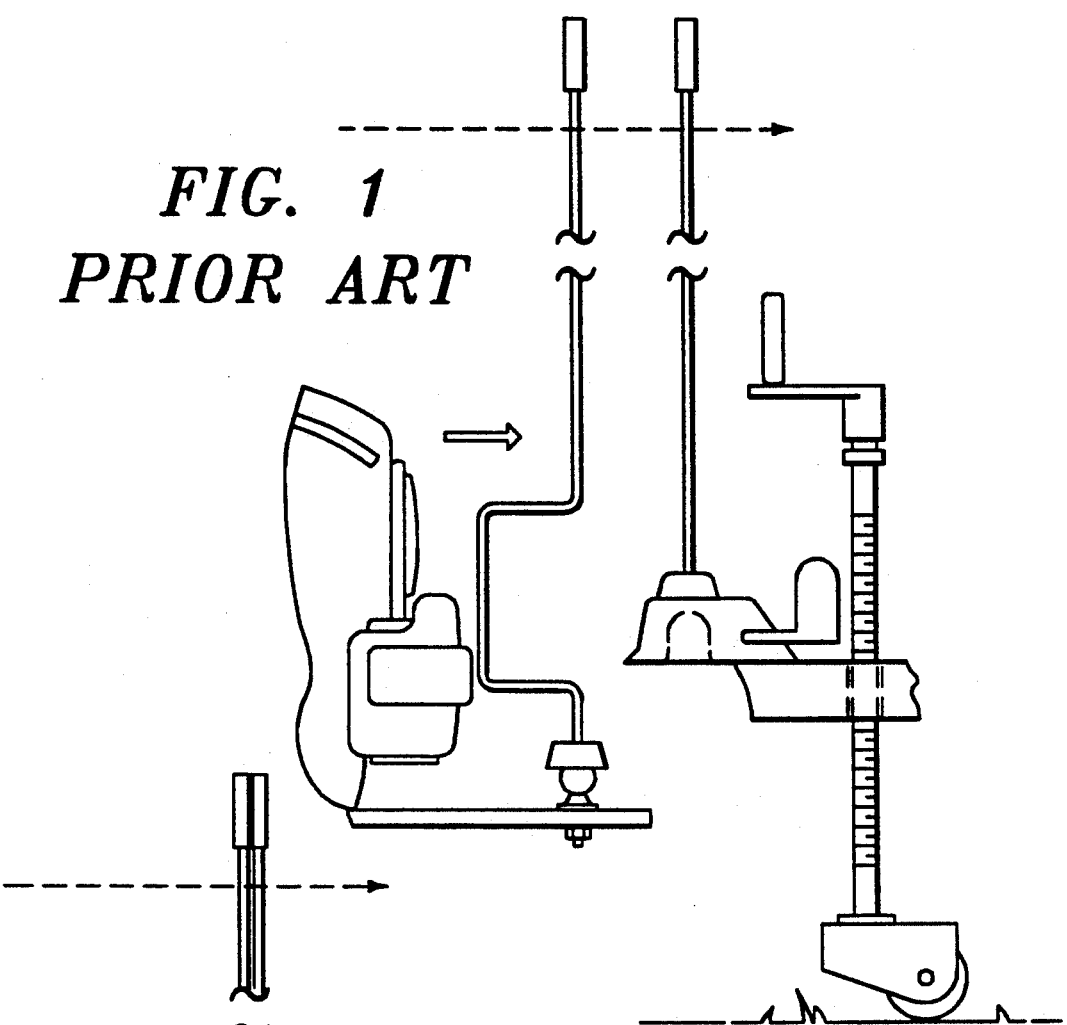
FIG. 1 is an orthographic side view of a prior art structure in a first position.

With reference now to the drawings, and in particular to FIGS. 1 to 7 thereof, a new and improved trailer hitch alignment guide apparatus embodying the principles and concepts of the present invention and generally designated by the reference numeral 10 will be described.

Figure 2:
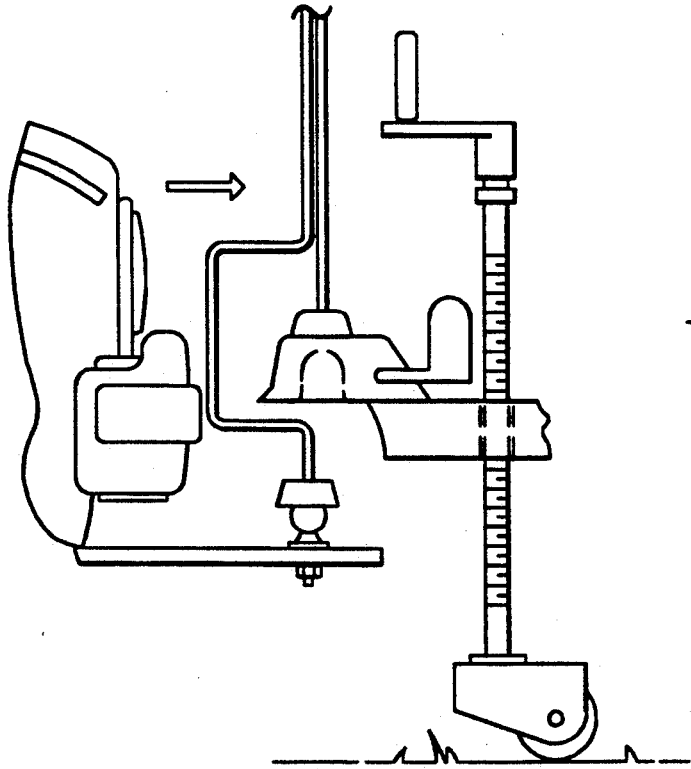
FIG. 2 is an orthographic view of the prior art structure in the second aligned position.
Figure 5:
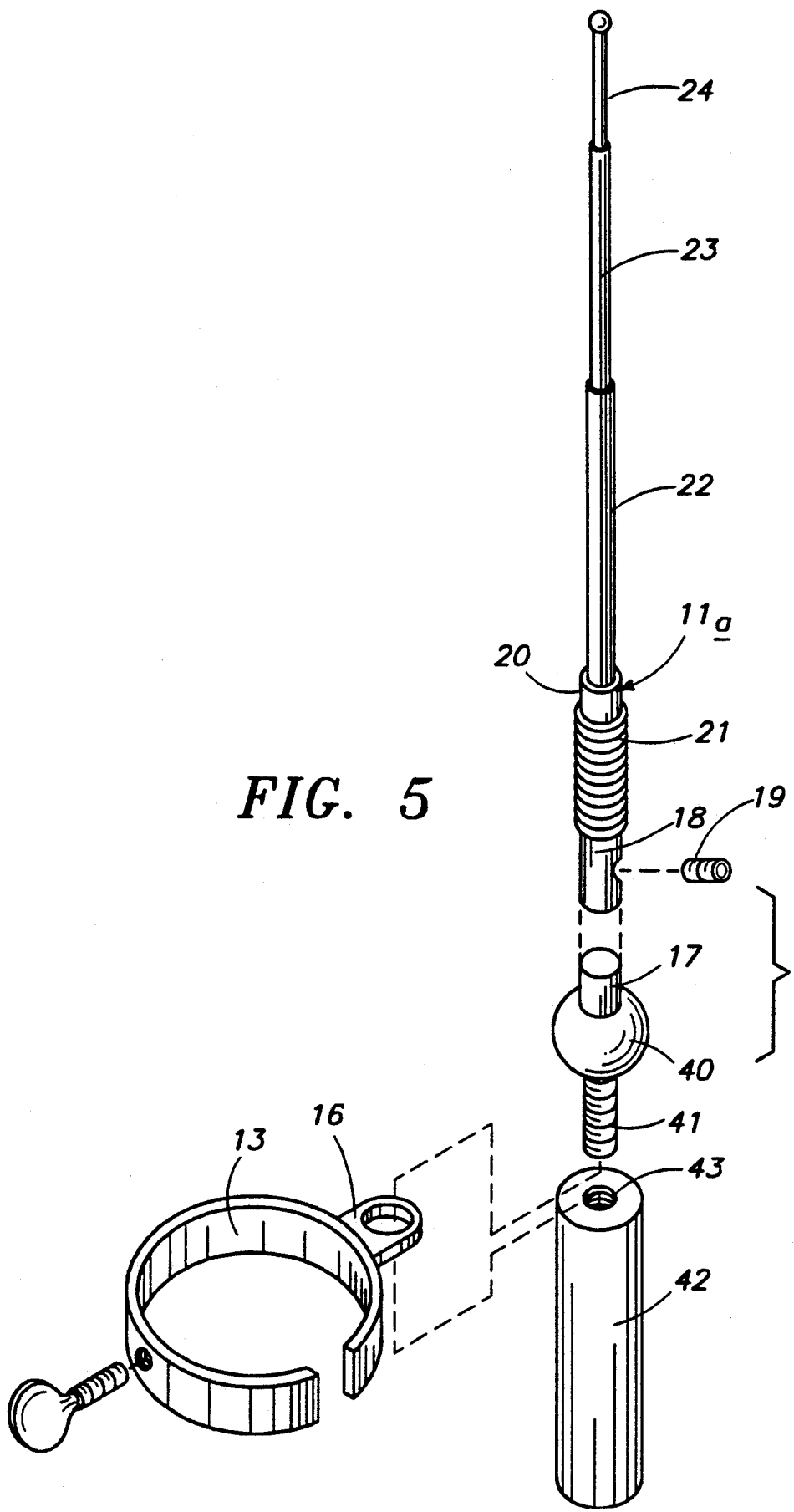
FIG. 5 is an isometric illustration of a modified first guide assembly.
Figure 6:
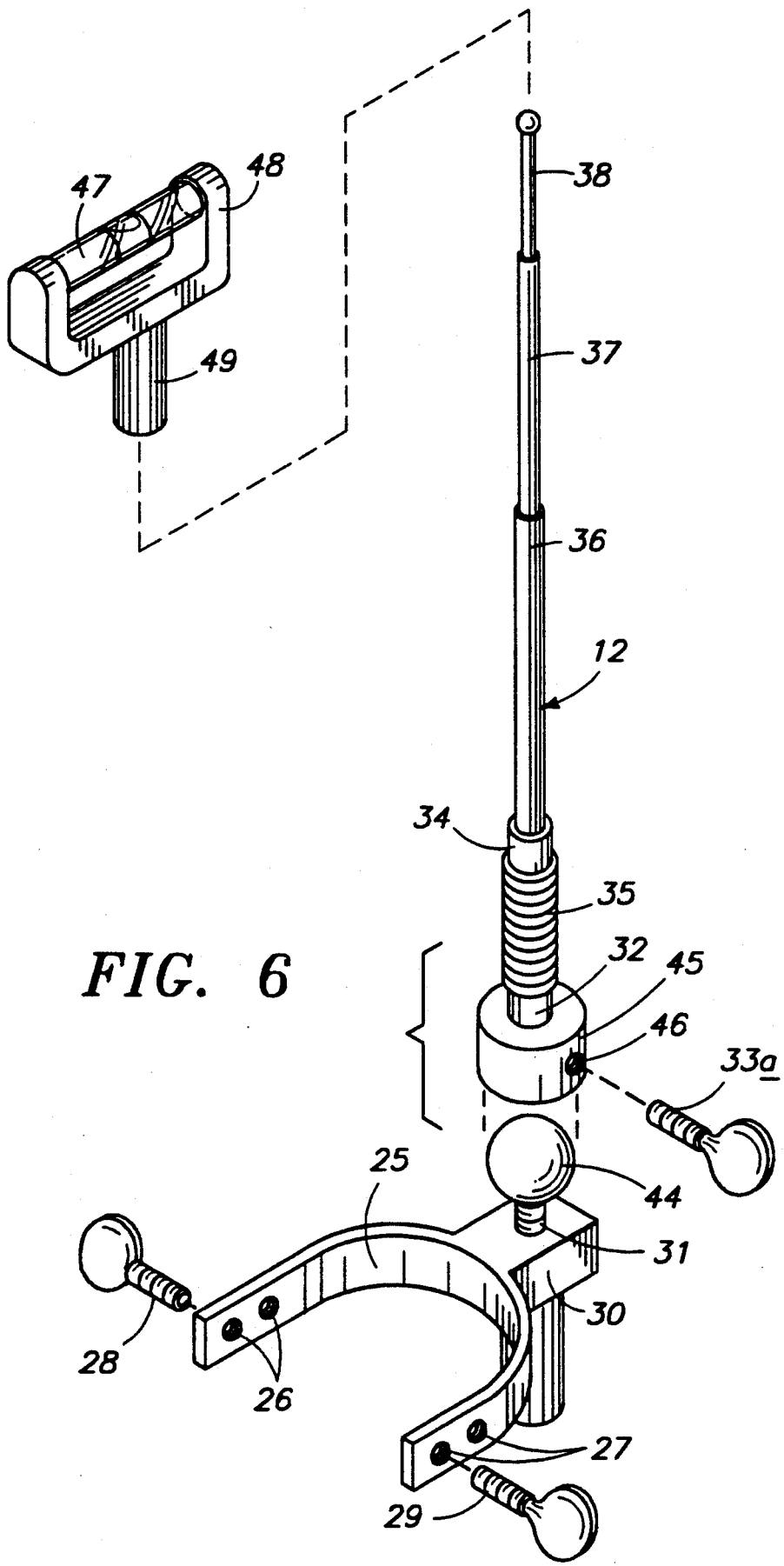
FIG. 6 is an isometric illustration of a modified second guide assembly of the invention.

The FIGS. 1 and 2 illustrate respective first and second positions in use of the apparatus as set forth in U.S. Pat. No. 4,666,176 to Sand to provide reception of an associated trailer tongue and socket within an overlying coaxially aligned relationship relative to the underlying ball structure.

Figure 7:
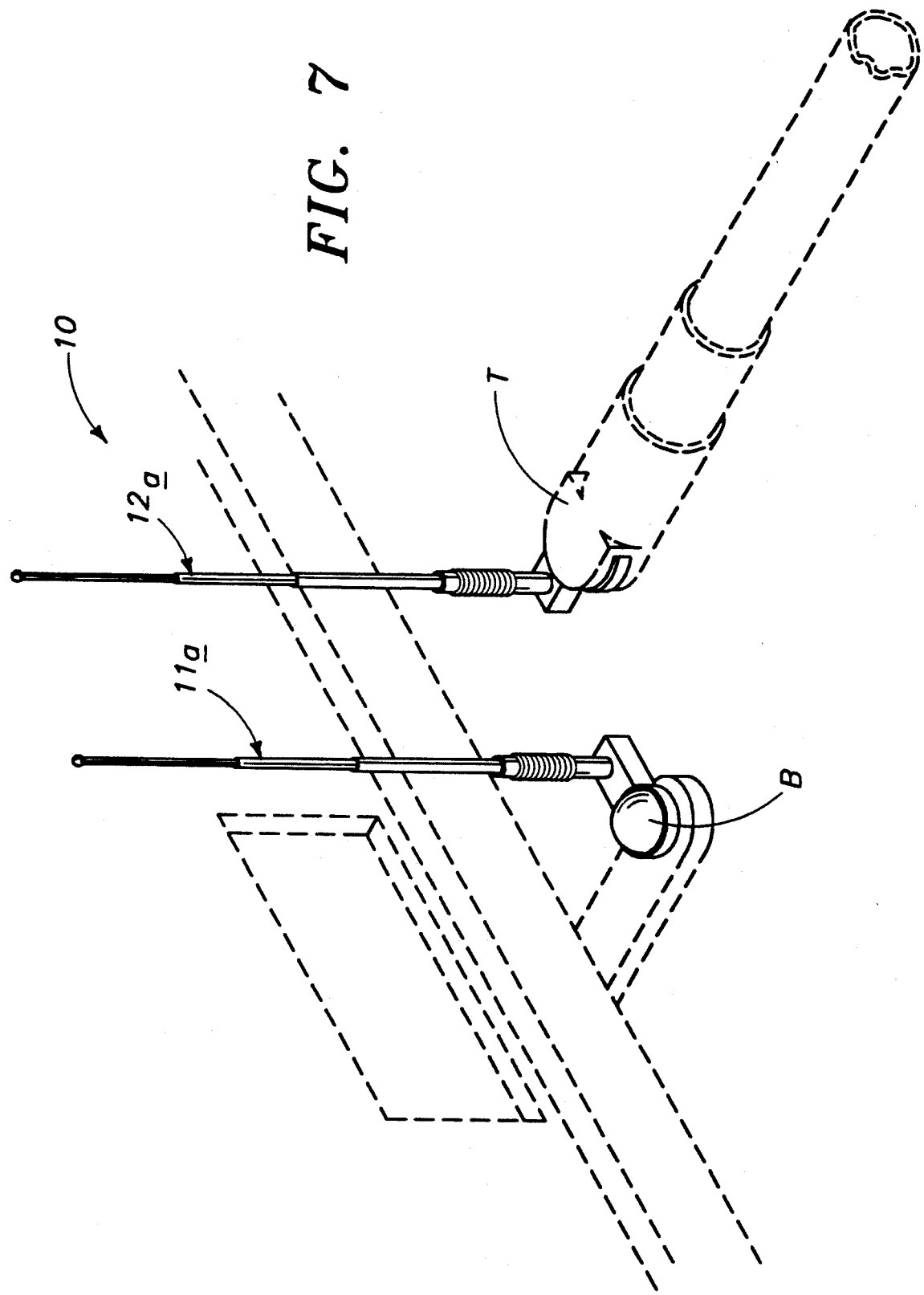
FIG. 7 is an isometric illustration of the organization in use.

More specifically, the trailer hitch alignment guide apparatus 10 of the instant invention essentially comprises a first guide assembly 11 arranged for cooperation with a second guide assembly 12, in a manner as indicated in FIG. 7, for directing coextensive abutment of the telescoping support legs of the first guide assembly relative to the telescoping legs of the second guide assembly.

To this end, the first guide assembly 11 includes a split cylindrical clamp ring 13 arranged for securement about the trailer ball "B", with the clamp ring having a threaded clamp ring bore 14 directed therethrough receiving a threaded clamp ring fastener 15 directed through the clamp ring bore for engagement with the ball to secure the first guide assembly relative to the trailer ball "B", as illustrated in FIG. 7. A first support lug 16 is mounted exteriorly of the clamp ring 13 to an outer surface of the side wall thereof having a first support lug boss 17 oriented parallel relative to an axis of the cylindrical clamp ring 13. A first support base lower end portion 18 has a cylindrical socket to receive the first support lug boss 17 therewithin, with a first support base fastener 19 directed through the first support base lower end portion 18 to secure the components together. A first support base upper end portion coaxially aligned with and spaced from the first support base lower end portion includes a first spring coupling 21 to bias the members 18 and 20 into the coaxially aligned relationship, as illustrated in FIG. 3, but to accommodate impact permitting return of the components to the coaxially aligned relationship as illustrated. A first support base first leg 22 is telescopingly received within the first support base upper end portion 20. A first support base second leg 23 is telescopingly received within the first support base first leg 22 and similarly, a first support base third leg 24 is telescopingly received within the first support base second leg to coaxially align the legs 22-24 relative to the first support lug boss 17.

The second guide assembly 12 includes a U-shaped clamp 25 having a plurality of respective first and second bores 26 and 27 arranged on opposed sides of legs of the U-shaped clamp, with the first and second bores receiving respective first and second fastener members 28 and 29 to clamp opposed sides of a trailer tongue "T", as illustrated in FIG. 7. A second support lug 30 is mounted medially and exteriorly of the U-shaped clamp 25, with the second support lug 30 having a second support boss 31 fixedly mounted thereto oriented generally orthogonally relative to the first and second bores 26 and 27. A second support base 32 is provided having a tubular socket to received the second support lug boss 31 therewithin, with the second support base lower end portion 32 having a second support boss lower end portion fastener 33 directed into the second support boss 32 to secure the second support boss lower end portion 32 to the second support lug boss 31. A second support boss upper end portion 34 coaxially aligned in a first position by a second spring coupling 35 to the second support boss lower end portion 32 is deflectable from the coaxially aligned orientation and returned thereto by the second spring coupling 35. A second support base first leg, second leg, and third leg 36, 37, and 38 respective that are respectively telescopingly received relative to one another are in turn telescopingly received within the second support base upper end portion 34, in a manner as described relative to the legs 22, 23, and 24 of the first guide assembly 11.

As described, first guide assembly 11a (see FIG. 5) includes a first support lug bore 39 mounted through the first support lug 16 to receive a first spherical base 40, with the first spherical base 40 defined by a first diameter and the first support lug bore 39 defined by a second diameter less than the first diameter to prevent directing the spherical base 40 through the first support lug bore 39. The first spherical base 40 further includes a base threaded rod 41 radially and integrally mounted relative to the first spherical base 40 and received within a counter-weight bore 43 and associated elongate counter-weight to stabilize the organization when mounted to the first support lug 16, with the counter-weight 42 positioned below the first support lug 16 and the first spherical base 40 mounted above the first lug 16. The first support lug boss 17 is coaxially aligned with the base threaded rod 41 on a diametrically opposed side thereof to be received within the first support base lower end portion 18, in a manner as described above. In this manner, vertical alignment about the first spherical base 40 is provided to permit reorientation of the legs 22, 23, and 24 as required for such vertical positioning.

In a like manner, a modified second guide assembly 12 has a second spherical base 44 mounted to an upper distal end of the second support lug boss 31 and the second spherical base 44 received within a cylindrical receiving cup 45 fixedly mounted to a lower distal end of the second support base lower end portion 32 that in turn has a receiving cup bore 46 receiving a modified second support base fastener 33a to clamp the receiving cup 45 to the second spherical base 44.

To permit proper vertical alignment of the legs of the first and second guide assemblies 11 and 12, an elongate spirit level 47 mounted to an underlying base 48 has a base mounting tube 49 directed downwardly relative to the level base 48 and orthogonally oriented relative to the spirit level 47, with the mounting tube 49 arranged for receiving selectively the second support base third leg 38 and selectively the first support base third leg 24 to use a spirit level in vertical alignment when the mounting tube 49 is positioned to receive the third legs.

Subsequently, upon mounting of the first and second guide assemblies to the respective trailer ball "B" and the trailer tongue "T", an individual peering rearwardly from an associated tow vehicle may ascertain the proper positioning of the telescoping leg portions of each guide assembly to effect abutment of the guide assemblies relative to one another and thereby the alignment of the trailer tongue to the trailer ball. It should be noted that the second support telescoping legs are arranged to be received between the first support telescoping legs and the trailer ball "B" for the coaxial alignment of the socket of the associated tongue "T" and the trailer ball "B". The trailer tongue "T" has a typical construction, such as illustrated in the prior art and indicated in the FIGS. 1 and 2.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer hitch alignment guide apparatus for aligning a trailer socket of a trailer tongue to a towing vehicle ball, wherein the apparatus comprises, a first guide assembly arranged for securement to the ball, wherein the first guide assembly includes a cylindrical clamp ring arranged for securement about the ball, the cylindrical clamp ring having a first support lug mounted to an exterior surface of the clamp ring, and the first support lug having a first support base lower end portion mounted adjacent to the first support lug, the first support base lower end portion including a first spring coupling and a first support base upper end portion, with the first support base upper end portion, the first support base lower end portion, and the first spring coupling coaxially aligned relative to one another, and at least a first support base first leg telescopically received relative to the first support base upper end portion coaxially aligned relative to the first support base upper end portion extending upwardly thereof, and the second guide assembly arranged for securement about the trailer tongue, including a U-shaped clamp, the U-shaped clamp having a second support lug mounted exteriorly of the U-shaped clamp, the second support lug including a second support base lower end portion arranged for securement to the second support lug extending upwardly thereof, and the second support base lower end portion including a second support base upper end portion and a second spring coupling interposed between the second support base lower end portion and the second support base upper end portion to coaxially align the second support base upper end portion relative to the support base lower end portion, and at least a second support base first leg telescopically received within the second support base upper end portion and coaxially aligned relative to the second support base upper end portion, and the first support base first leg telescopically receives a first support base second leg, and the first support base second leg telescopically receives a second support base third leg, the second support base first leg telescopingly receives a second support base second leg, the second support base second leg telescopingly receives a second support base third leg, and the first support lug includes a first support lug bore directed therethrough, and a first spherical base having a first support lug boss fixedly mounted thereto radially aligned with the first spherical base, and a first spherical base threaded rod coaxially aligned with the first support lug boss on a diametrically opposed side of the first spherical base, with the first spherical base threaded rod arranged through the first support lug bore, and a counter-weight positioned below the first support lug, the counter-weight having a counter-weight bore fixedly receiving the first spherical base threaded rod therewithin, and the first support base lower end portion having a tubular cavity receiving the first support lug boss therewithin, and the second support lug includes a second support lug boss, the second support lug boss having a second spherical base mounted to an upper distal end of the second support lug boss, and the second support base lower end portion having a cylindrical receiving cup, and the cylindrical receiving cup coaxially aligned with the second support base lower end portion for receiving the second spherical base therewithin, and a receiving cup fastener directed through the cylindrical receiving cup for fixedly securing adjustably the cylindrical receiving cup relative to the second spherical base.

2. An apparatus as set forth in claim 1 wherein the U-shaped clamp includes at least one first bore and at least one second bore, wherein the first bore and the second bore are coaxially aligned, and the first bore receives a first fastener, the second bore receives a second fastener for engagement with the trailer tongue, and the second support lug boss is orthogonally oriented relative to the first bore and the second bore.

3. An apparatus as set forth in claim 2 including an elongate spirit level, the elongate spirit level including a spirit level base positioned below the spirit level, and the spirit level base including a base mounting tube orthogonally oriented relative to the elongate spirit level, the base mounting tube arranged for selectively receiving the second support base third leg and the first support base third leg therewithin for vertical adjusting and alignment of the second support base third leg and the first support base third leg to orient the second support base third leg and the first support base third leg in a parallel relationship.

* * * * *